(12) United States Patent
Ranganathan

(10) Patent No.: US 7,440,632 B2
(45) Date of Patent: Oct. 21, 2008

(54) TECHNIQUE FOR PERFORMING ERROR DIFFUSION

(75) Inventor: Sridharan Ranganathan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 11/123,593

(22) Filed: May 6, 2005

(65) Prior Publication Data

US 2006/0250651 A1    Nov. 9, 2006

(51) Int. Cl.
*G06K 9/36* (2006.01)

(52) U.S. Cl. .................. 382/252; 382/237; 382/239

(58) Field of Classification Search .............. 382/252, 382/237, 239, 272; 358/3.03, 1.9, 3.04, 3.05, 358/466; 347/2, 67, 16, 14
See application file for complete search history.

(56) References Cited

U.S. PATENT DOCUMENTS

| 5,553,166 | A  * | 9/1996 | Kakutani ............... 382/252 |
| 5,764,811 | A  * | 6/1998 | Kakutani ............... 382/252 |
| 5,768,432 | A  * | 6/1998 | Schweid ............... 382/237 |
| 6,373,990 | B1 * | 4/2002 | Ushida et al. ........... 382/252 |
| 7,268,919 | B2 * | 9/2007 | Katsuyama ............ 358/3.03 |

* cited by examiner

*Primary Examiner*—Anh Hong Do
(74) *Attorney, Agent, or Firm*—Erik M. Metzger

(57) ABSTRACT

A technique to perform error distribution in a graphics system. More particularly, embodiments of the invention include at least one technique to distribute the error resulting from converting computer generated graphics pixels from one pixel depth to another.

25 Claims, 5 Drawing Sheets

TECHNIQUE FOR PERFORMING ERROR DIFFUSION

FIELD OF INVENTION

Embodiments of the invention described herein relate to digitally-generated graphics applications. More particularly, embodiments of the invention relate to a technique to accelerate portions of an error diffusion algorithm while allowing other portions of the algorithm to remain proprietarily performed by third party solutions in digital graphics applications, such as print image applications and computer-based graphical image rendering.

BACKGROUND

Error diffusion techniques are used in various prior art graphical image acceleration schemes to aid in the conversion of a digitally-generated image from one pixel resolution ("pixel depth") to another. Graphic images, whether generated for printer applications or for two dimensional ("2D") or three dimensional ("3D") computer-based graphics rendering applications are typically represented by values known as "pixels". Pixels may have an associated color and/or texture value, represented by a combination of component colors and/or textures. For example, in printer applications, pixels may be represented by four component color values, cyan, magenta, yellow, and black, (CMYK) which contribute to the overall color value of a pixel. In some prior art printer applications, CMYK color components may be represented by bit words comprising up to 8 bits per component, creating a 32 bit representation of the pixel (8 bits multiplied by 4 components).

Similarly, in computer-based graphics rendering applications, a pixel may be represented by three or more components, including red, green, and blue (RGB). In other applications, a pixel may be represented by values that aren't directly representative of colors, but of other properties of the pixel, such as the pixel's texture. In computer-based 2D/3D graphics applications, each component, RGB, may be represented by a number of bits, such as 8, which contribute to a pixel value having 24 bits (8 bits multiplied by 3 components).

It may be desirable to reduce the number of bits necessary to represent a pixel by converting it to a different component representation, which in turn reduces the pixel depth. This may be true for applications that do not need a certain color representation of an image, but may rather display an image adequately using fewer colors or merely shades of gray (e.g., "gray scale"). Color pixels may be converted by converting the individual components that make up the pixel. In this case, each component of the representation of a pixel may be converted from an original amplitude resolution to a different amplitude resolution. For example, by converting each 8 bit component to 1 bit makes the CMYK 32 bit color pixel which comprises of 4 components of 8 bits each into a 4 bit color pixel comprising of 1 bit each. Similarly in the case of grayscale, a pixel may be converted from a 8 bit pixel that may have any one of 256 values (ranging from 0 to 255) to a pixel that is represented by 1 bit that is either "on" or "off" (82-1 color/component).

As with any process that reduces the resolution of representation, there is a resultant "error" that is a result of the reduced resolution. This "error" may be dispersed or "diffused" across other pixels in an image in order to create a more smooth transition between the new colors of the pixels resulting from the conversion in pixel component color depth. For example, the error that results from a conversion from 8 bits per pixel component (i.e. 256 values/component) to a 1 bit per pixel component (i.e. on/off) could be distributed to a certain pre-defined number of immediate neighbors.

In order to convert pixels from a higher amplitude resolution to a lower resolution, the original pixel may need to be compared to a "threshold" value to determine whether the pixel component is to be turned on or off. In other techniques, more than one threshold may have to be used, if say for example, the lower amplitude resolution is greater than 2 bits or more.

The difference between the original pixel component value (8 bit value, in the above example) and the threshold may define the error in the pixel component conversion. In order to improve the visual quality in the transition among pixels that have been converted to a lower pixel component resolution, the error may be distributed among neighboring (e.g., adjacent) pixels such that the state of the neighboring pixels are effected by the error a neighboring converted pixel. Such an error distribution may contribute to a neighboring being turned "on" (in the previous example) instead of "off", as the error contributes to a value of the pixel that pushes it over the threshold between "on" and "off". Conversely, the error may detract from the converted pixel value such that the pixel is turned "off" instead of "on".

One prior art technique for distributing the error among neighboring pixels involves a proprietary algorithm implemented by a third party graphics vendor, for example, that may be performed in proprietary hardware or software. Proprietary algorithms may determine the threshold value and perform the threshold comparison ("thresholding") in order to allow a user to have control over this aspect of the pixel color component depth conversion process in addition to other functions associated with the conversion, such as the error generation and distribution. One problem with this prior art solution is that proprietary hardware that performs all of these functions can often increase computer system cost, while proprietary software performing these functions is sometimes not optimized to run on a particular processor. Therefore, the system cost and performance may suffer as a result. Furthermore, various functions, such as error generation and distribution may not be functions that change among various proprietary solutions, therefore these functions may consume unnecessary proprietary hardware or software resources and possibly inhibit error distribution performance without adding significant value to the proprietary solution.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

At least one embodiment of the invention provides a technique for pixel color component error distribution among graphics pixels that leverages the cost and performance benefits hardware of graphics acceleration techniques while allowing proprietary hardware and/or software to realize performance and/or cost benefits of performing other aspects of the pixel color component error distribution process. Advantageously, at least one embodiment of the invention performs in hardware one or more functions common among graphics error diffusion techniques, such as pixel color component error calculations and error distributions to other pixels, while interfacing with more proprietary graphics error diffusion functions, such as threshold value determination and thresholding functions, performed by a graphics solutions vendor or by a number of graphics solutions vendors. Furthermore, at least one embodiment provides an acceleration technique to perform other application-specific functions associated with graphics error diffusion techniques, such as threshold value determination and thresholding functions, in a manner that may improve graphics acceleration performance without incurring significant system cost overhead.

Various embodiments within this disclosure may be applied to a number of graphics applications, including 2D/3D computer-based graphics rendering via 2D/2D graphics acceleration logic or software, and 2D image printing applications. Furthermore, embodiments of the invention may be applied to other graphics applications that are not necessarily currently available to consumers.

Figure 1:
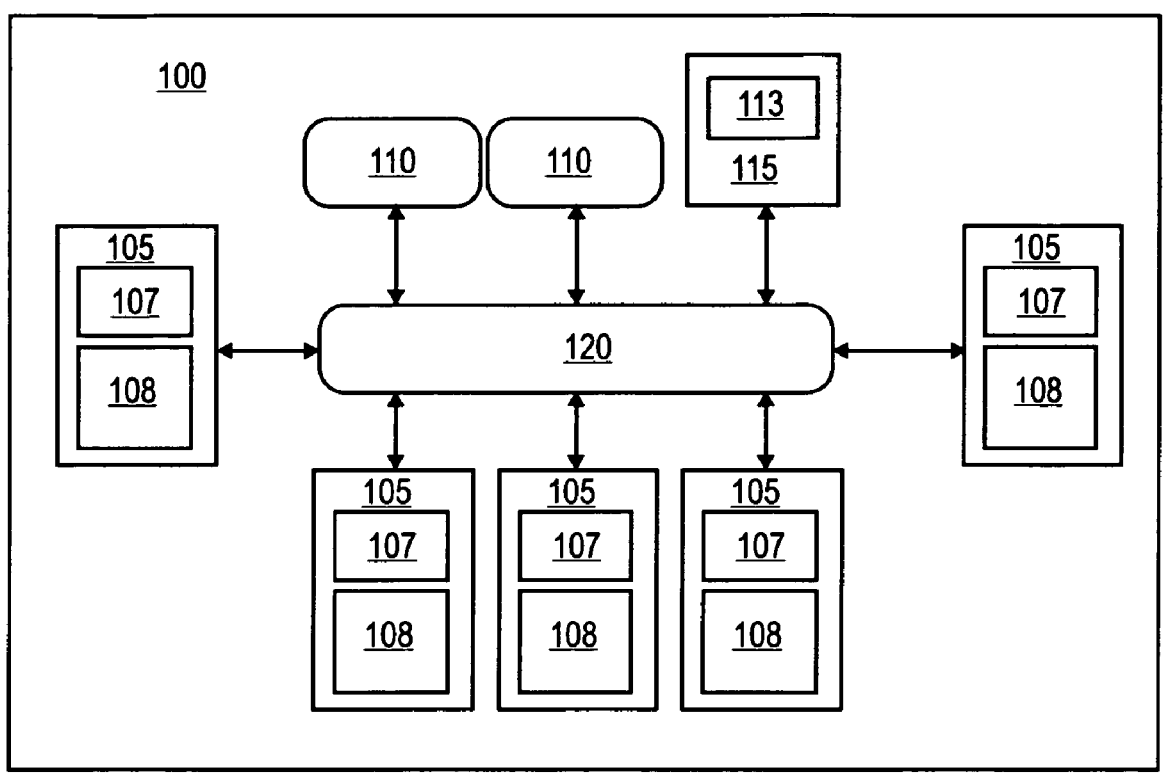
FIG. 1 illustrates an image signal processor (ISP) in which one embodiment of the invention may be used.

FIG. 1 illustrates an image signal processor (ISP) in which one embodiment of the invention may be used. Alternatively, one embodiment may be located outside of the ISP illustrated in FIG. 1. The ISP 100 of FIG. 1 contains, inter alia, one or more processing elements 105, each of which may or may not include an instruction memory 107 for storing instructions and computational logic 108, such as an arithmetic logic unit (ALU). The processing element(s) may be used in some embodiments to decode various graphics-related instructions and/or perform mathematically intensive operations that are commonly used by various graphics applications. In addition, the ISP of FIG. 1 contains at least one graphics acceleration unit 110 to perform various operations associated with processing graphics images.

For example, in one embodiment, the graphics operations called for by the instructions decoded by the processing elements may be off-loaded from the processing element(s) to one or more of the graphics acceleration units. Redistributing graphics operations in this manner may increase the speed with which various operations can be performed by taking advantage of more customized graphics logic contained within the graphics accelerator unit(s).

Data 113, such as texture maps, images, etc., that may be used by either the processing elements and operated upon by the instructions stored in the instruction memory of the processing element(s) may be accessed via a memory interface logic 115, such as a memory control hub (MCH), in one embodiment of the invention. In other embodiments, this data may be accessed using other types of memory interface logic, such as a graphics port.

The processing element(s), graphics accelerator unit(s), and memory interface(s) may all communicate with each other, in one embodiment, via a set of registers, such as the general purpose registers (GPRs) 120 illustrated in FIG. 1. The GPRs of FIG. 1 may temporarily or more permanently hold data, instructions, etc., communicated between each of the processing elements, graphics accelerator units, and MCH illustrated in FIG. 1. Accordingly, various registers in the GPRs may be assigned, or "mapped", between various functional units that may use them.

In one embodiment of the invention, one or more of the graphics accelerator units of FIG. 1 may include error diffusion acceleration logic to perform one or more operations associated with graphics error diffusion. Furthermore, in at least one embodiment, the GPRs enable a communication interface between the various error diffusion acceleration logic functions performed by error diffusion acceleration logic and one or more proprietary and/or third-party graphics acceleration software or hardware logic.

Figure 2:
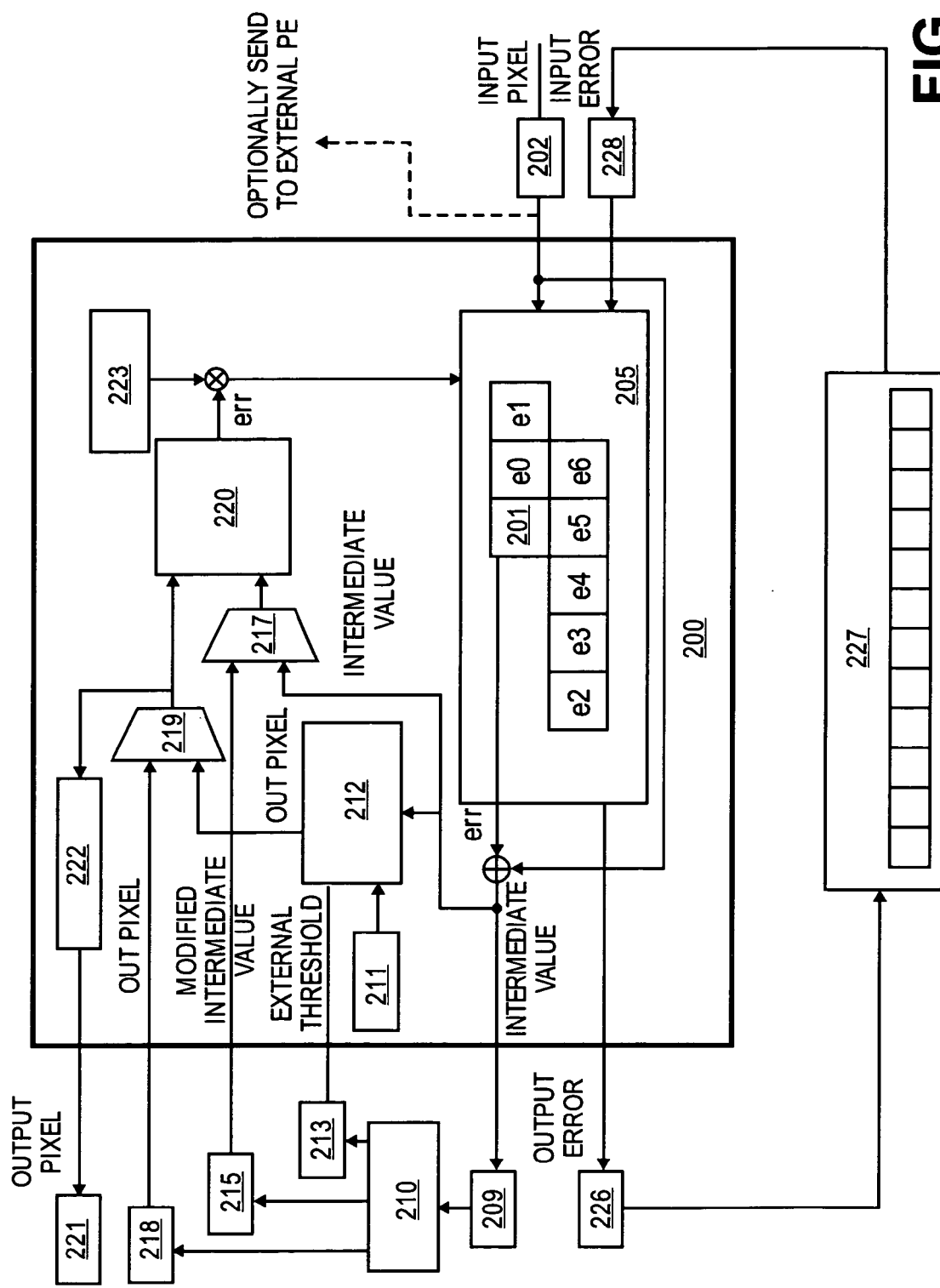
FIG. 2 illustrates error diffusion logic used in association with at least one proprietary pixel component color depth conversion software program that may be performed on one or more of the processing elements illustrated in FIG. 1.

FIG. 2 illustrates error diffusion logic used in association with at least one proprietary pixel component color depth conversion software program that may be performed on one or more of the processing elements illustrated in FIG. 1. Alternatively, the proprietary graphics acceleration software program may be performed on other processing logic external to the ISP of FIG. 1. Furthermore, the ISP of FIG. 1 may be located within a microprocessor.

In general, the error diffusion acceleration logic 200 of FIG. 2 receives one or more input pixels 202. The error buffer, including pixel entry 201, holds error values that were diffused to the pixels from prior pixels that have already been converted.

The combination (e.g., sum) of the input pixel value with the error buffer value for the corresponding pixel results in an "intermediate value", which is then stored, at least temporarily, in GPR 209. A user may use software and/or hardware to further perform operations on the intermediate value, such as thresholding operations (discussed below) or other modifications to the intermediate value. In one embodiment, a user, such as a third-party graphics vendor, may run code on one of the PEs 210 that performs a variety of operations on the intermediate value. In one embodiment, the threshold value that is used for thresholding and for determining the output pixel value is not a constant value but instead varies based on the raster position of the pixel and/or the input pixel value itself and/or the intermediate value. In one embodiment, for example, a spatially dithered thresholding technique, in which a white noise is added to the image to remove image artifacts, may be used. The white noise may be added by modifying the threshold using a spatial dither matrix. In other embodiments, other thresholding techniques may be used.

The new threshold value can then be fed to a threshold logic circuit 212 via GPR 214 that will either apply the threshold assigned by the external (user) thresholding mechanism via GPR 213 or the default threshold value 211 assigned by the error diffusion acceleration logic. The default threshold may be application-dependent and is not intended to be limited to any particular value or set of values.

In addition to or in lieu of thresholding, the external (user) graphics software/hardware may modify the intermediate value according to some algorithm dictated by the user and stored (at least temporarily) in GPR 215. For example, in one embodiment, third party graphics software running on a PE or other processing hardware may add a value to the intermediate value to produce a modified intermediate value. The modified intermediate or the intermediate value may be selected by MUX 217, in one embodiment, to help determine the next error value that will be distributed across neighboring pixels via error generation logic 220. The selection of the modified intermediate value versus the intermediate value may be controlled either by the user or the error diffusion acceleration logic, and may be statically designated or dynamically altered based on some algorithm.

The output pixel state value, against which the modified or un-modified intermediate value is to be compared, can be generated from either the user (via third-party graphics software, for example) or by the error diffusion acceleration logic (via the threshold logic). In one embodiment of the invention, the output pixel state may be selected from either the user's algorithm via GPR 218 or from the error diffusion acceleration logic via MUX 219. The selection of whether to use the user-generated output pixel versus the one generated by the diffusion acceleration logic may be based on an algorithm defined by the user or from an algorithm defined by the error diffusion acceleration logic. For example, the user-specified output pixel is chosen anytime the output pixel is updated in GPR 218.

In addition to being fed to the error generation logic, the output pixel may be output to another program or logic device via GPR 221 within or outside of the ISP to be applied to the image to be displayed. In one embodiment, the format of the output pixel may be modified or a number of output pixels may be combined before the output pixel is stored in GPR 221 via packing logic 222. In one embodiment, the packing logic combines a number of converted pixel component values before storing the combined values into GPR 221, so as to reduce the number of operations necessary to output the converted pixel conversion values.

The error generation logic, in one embodiment, takes either the user-generated or the error diffusion acceleration logic-generated output pixel and performs a value comparison with either the intermediate value or the modified intermediate value to calculate an error value. In one embodiment, the error value is the difference between the output pixel state value and the modified or un-modified intermediate pixel state value. In other embodiments, other algorithms may be applied to determine the error value. In one embodiment, for example, the error value is modified or "weighted" by a coefficient 223 via combining logic, such as a multiplier. In one embodiment, the combining logic is an adder that adds the coefficient to the error value and the coefficient is either dynamically chosen or statically chosen according to an algorithm.

After the error (which may be weighted by a coefficient in some embodiments) is determined, the error may be distributed across a number of pixels that neighbor a pixel whose state value is to be calculated, so that the distributed (weighted) error may in turn contribute to the respective "intermediate" values of the neighboring pixels. In one embodiment, the error is distributed throughout entries of the error buffer, whose entries each correspond to a neighboring pixel of the pixel to be calculated. In the embodiment illustrated in FIG. 2, the error buffer 205 contains at least 7 entries corresponding to the 7 neighboring pixels to receive a distribution of the error value and one entry corresponding to the pixel whose error is being calculated. Once the error of the pixel is calculated and distributed across the neighboring pixels, some of the distributed values are output to GPR 226 and buffered into a circular error buffer 227, so that the pixel map of the error buffer may traverse the image in a manner described below without losing error values that may need to be updated as the error conversion process continues. In one embodiment, the circular error buffer is stored in the MCH, whereas in other embodiments, the circular error buffer may be in some other structure such as off-chip memory.

The configuration of pixel value storage locations within the error buffer 205 illustrated in FIG. 2, is one configuration that is intended to map to corresponding pixels of an image. In particular, the error buffer of FIG. 2 maps to three pixels of a first row of image pixels and five pixels of the row immediately following the first row (top to bottom) of the image. In one embodiment, the error buffer pixel map stores corresponding pixel (and pixel error) values in a manner to effectively traverse the image in a left-to-right and top-to-bottom pattern, as the error calculations and error distributions are made for each pixel in the image. As the error buffer map traverses left-to-right across the image, the left-most pixel error storage entry of the lower group of five entries (e.g., "e2" in FIG. 2) is output and stored temporarily in GPR 226 until it can be stored in circular error buffer 227. When the error buffer map reaches the end of a row and proceeds to the row below, pixel error values that were stored in the circular buffer are read out in a first-in-first-out manner and stored starting in the right-most pixel error entry of the top row of three (e.g., "e1" in FIG. 2) via GPR 228. Therefore, pixel errors stored in second row of five of the error buffer pixel map in FIG. 2 are cumulatively altered as error is contributed to them again when they appear in the top row of three of the error buffer pixel map of FIG. 2.

The error values stored in the error buffer may correspond to pixel component depth conversion error values resulting from one or more preceding pixels. For example, in one embodiment, the error values, e0-e6, include conversion error resulting from each preceding pixel that's converted in image, such that error values, e0-e6, include a cumulative error value contributed from the neighboring converted pixels included in the pixel map of the error buffer. In at least one embodiment, the number and configuration of the pixel map of the error buffer may depend upon the rasterization pattern of the graphics application or acceleration logic.

Figure 5:
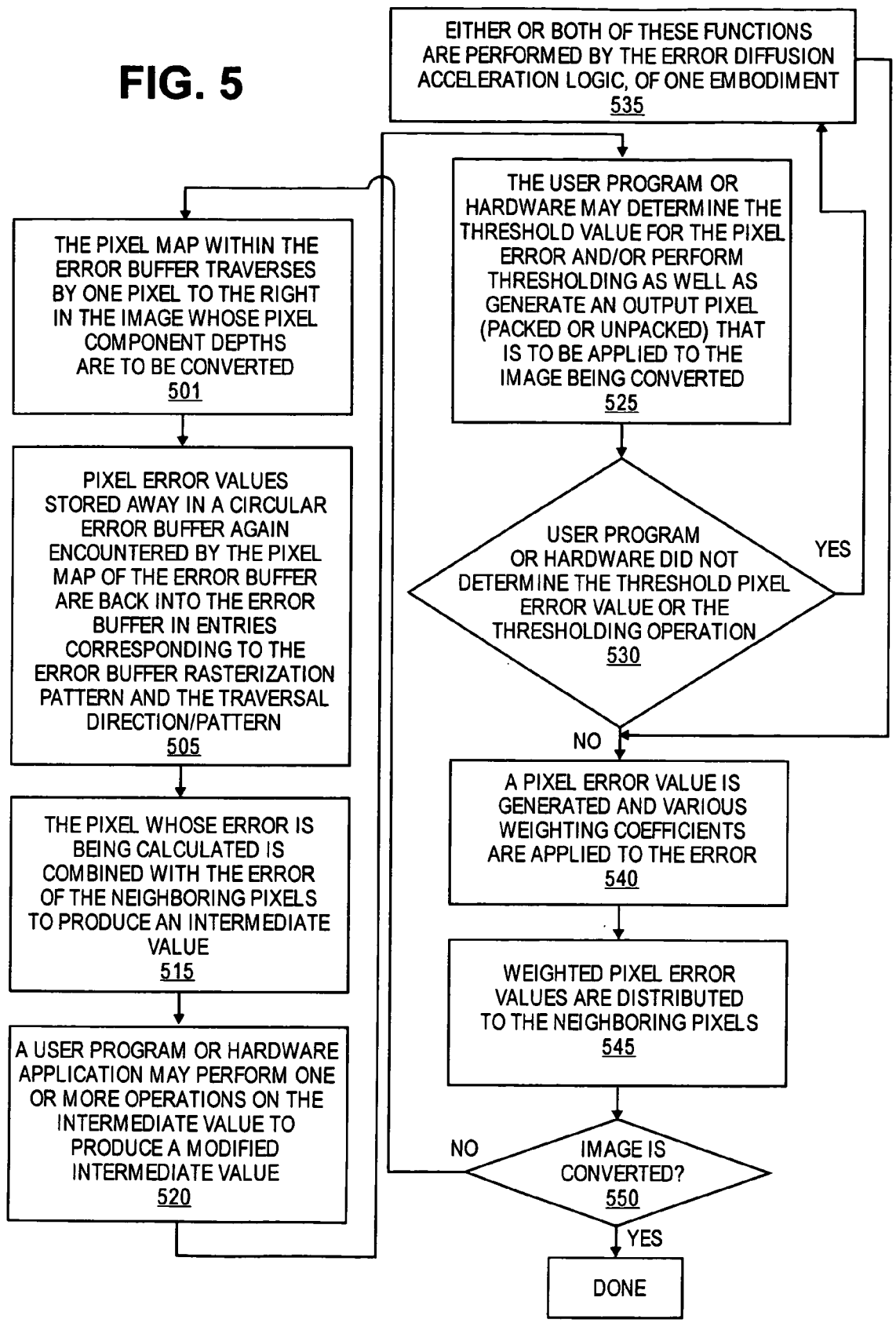
FIG. 5 is a flow diagram illustrating one iteration of a pixel error diffusion process.

FIG. 5 is a flow diagram illustrating one iteration of the pixel error diffusion process according to one embodiment of the invention. At operation 501, the pixel map within the error buffer traverses by one pixel to the right in the image whose pixel component depths are to be converted. The traversal is accomplished by inputting the next pixels to the right within the image into the error buffer entries, input pixel and e0-e6. Pixel error values stored away in a circular error buffer again encountered by the pixel map of the error buffer are back into the error buffer in entries corresponding to the error buffer rasterization pattern and the traversal direction/pattern at operation 505. In the example illustrated in FIG. 2, this may mean that error buffer entry, "e2", which may have been stored into the circular error buffer as the pixel map of the error buffer traverses the image, is restored to error buffer entry position, "e1".

The pixel whose error is being calculated is combined with e0 which cumulatively has been updated in prior operations with the error of the neighboring pixels, This combination produces an intermediate value at operation 515. A user program or hardware application may perform one or more operations on the intermediate value to produce a modified intermediate value at operation 520. Furthermore, the user program or hardware may determine the threshold value for the pixel error and/or perform thresholding as well as generate an output pixel (packed or unpacked) that is to be applied to the image being converted at operation 525. If the user program or hardware did not determine the threshold pixel error value or the thresholding operation, at operation 530, then either or both of these functions are performed by the error diffusion acceleration logic, of one embodiment, at operation 535 to determine the output pixel value. A pixel error value is generated based on the output pixel value and various weighting coefficients are applied to the error at operation 540. The weighted pixel error values are distributed to the neighboring pixels at operation 545, and the process repeats until the image is converted at operation 550.

Figure 3:
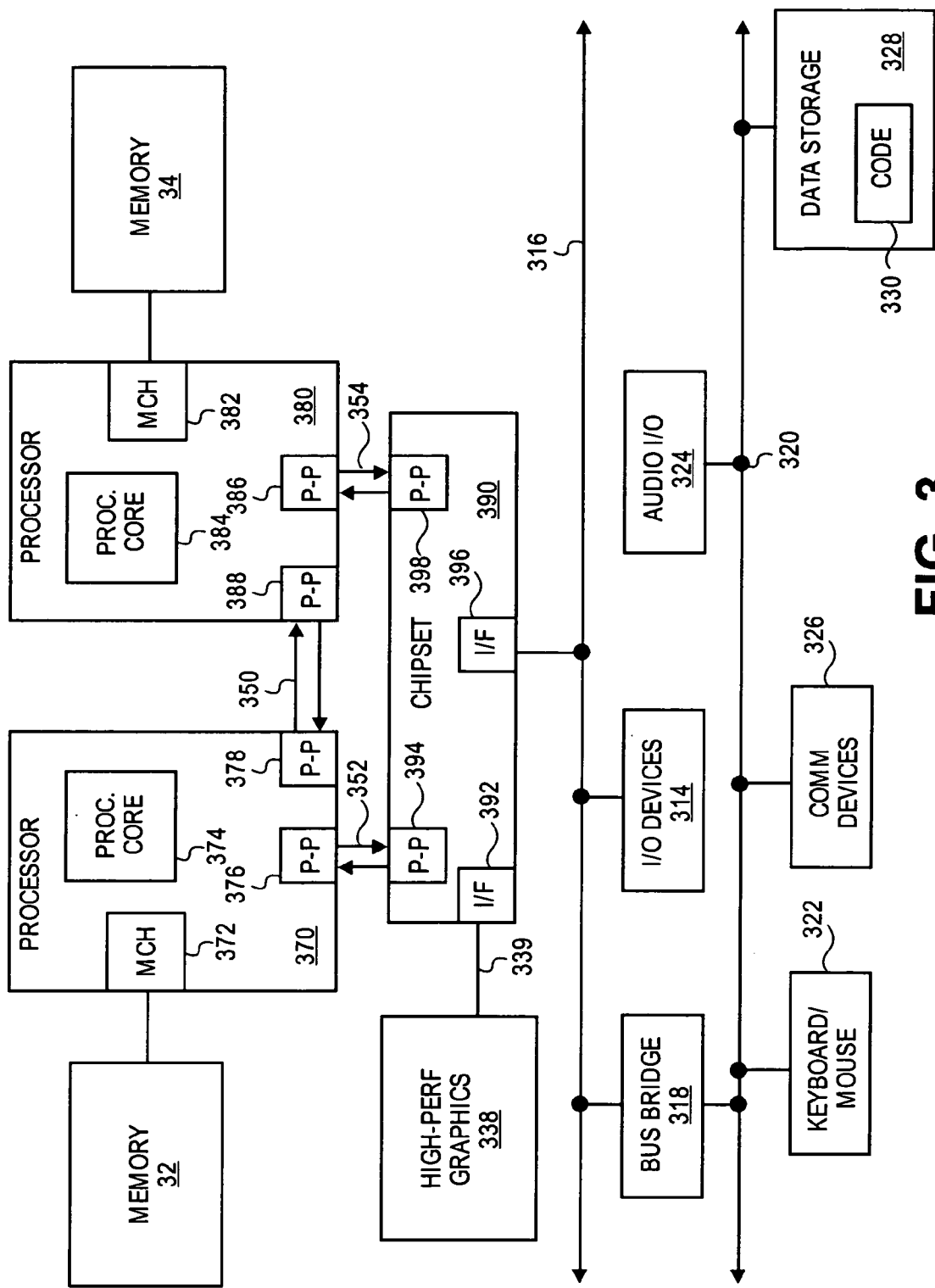
FIG. 3 illustrates a point-to-point (PtP) computer system in which one embodiment may be used.

FIG. 3 illustrates a point-to-point (PtP) computer system in which one embodiment may be used. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 22, 24. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339.

At least one embodiment of the invention may be located within the PtP interface circuits within each of the PtP bus agents of FIG. 3. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
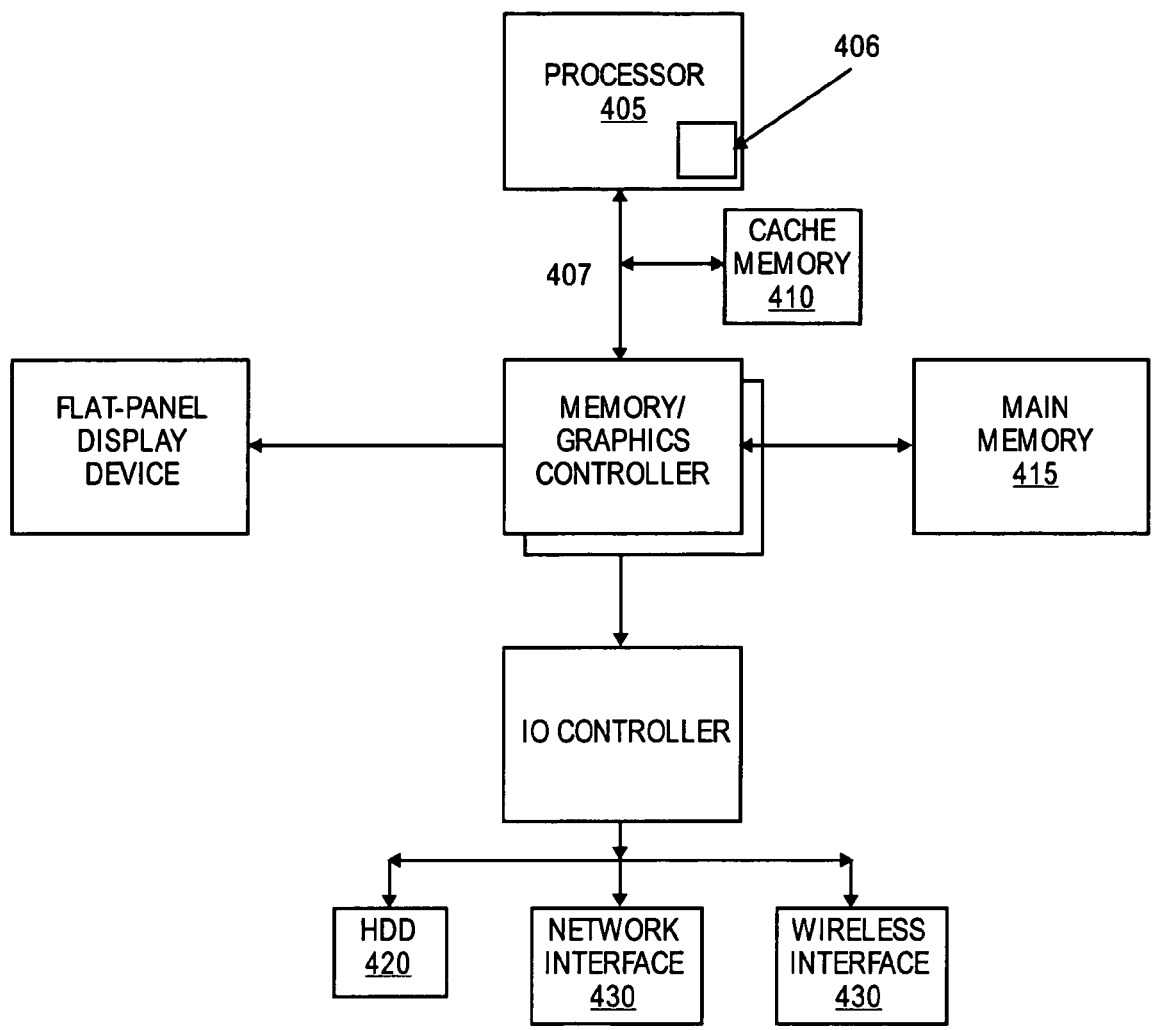
FIG. 4 illustrates a front-side-bus (FSB) computer system in which one embodiment of the invention may be used.

FIG. 4 illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache, which comprise an inclusive cache hierarchy in which coherency data is shared between the L1 and L2 caches.

Illustrated within the processor of FIG. 4 is one embodiment of the invention 406. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 containing various storage devices and technologies. The cache memory may be located either within the processor or in close proximity to the processor, such as on the processor's local bus 407. Furthermore, the cache memory may contain relatively fast memory cells, such as a six-transistor (6T) cell, or other memory cell of approximately equal or faster access speed.

The computer system of FIG. 4 may be a point-to-point (PtP) network of bus agents, such as microprocessors, that communicate via bus signals dedicated to each agent on the PtP network. Within, or at least associated with, each bus agent is at least one embodiment of invention 406, such that store operations can be facilitated in an expeditious manner between the bus agents.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. An apparatus comprising:
    error diffusion acceleration logic to perform at least one function associated with distributing pixel state error among at least one neighboring pixel within a digitally-represented image;
    a processing element coupled to the error diffusion logic to perform user-prescribed pixel error diffusion acceleration functions in conjunction with the at least one function.

2. The apparatus of claim 1 wherein the pixel state error is to be incurred as a result of converting between pixel component depths.

3. The apparatus of claim 1 wherein the at least one function includes pixel error calculation and distribution to the at least one neighboring pixel and either determining a pixel error threshold value or performing a thresholding function.

4. The apparatus of claim 1 wherein the user-prescribed functions include producing an output pixel to be applied to the digitally-represented image.

5. The apparatus of claim 3, wherein the at least one function includes producing an intermediate pixel value, the intermediate pixel value being a function of an initial pixel value and the error distributed to the neighboring pixels.

6. The apparatus of claim 5 wherein the user-prescribed functions include generating a modified intermediate pixel value.

7. A processor comprising:
    error diffusion acceleration logic to determine an intermediate pixel state value;
    a processing element to perform user-generated instructions, which if executed by the processing element, are to perform any of a group of functions consisting of: determining a threshold value, a thresholding operation, and determining a modified intermediate pixel state value using the intermediate pixel state value.

8. The processor of claim 7 wherein the error diffusion acceleration logic is to determine the threshold value or perform the thresholding operation, respectively, only if the user-generated instructions do not perform either of these functions.

9. The processor of claim 7 wherein the error diffusion acceleration logic comprises an error buffer to store an input pixel and neighboring error values associated with a plurality of pixels neighboring the input pixel.

10. The processor of claim 9 wherein each of the neighboring error values are to be derived from a cumulative weighted error value of preceding pixel error values.

11. The processor of claim 10 further comprising a circular error buffer to temporarily store the preceding pixel error values until they can be restored to the error buffer.

12. The processor of claim 9 wherein the error buffer is to store pixel error values according to a rasterization pattern that is to traverse an image, in which the pixels are displayed, in a top-to-bottom and left-to-right path.

13. The processor of claim 12 wherein the circular error buffer is stored within a memory controller hub.

14. The processor of claim 7 wherein the processor is an image signal processor.

15. A system comprising:
error diffusion acceleration logic to generate an intermediate pixel value;
a memory unit coupled to the error diffusion acceleration logic to store a set of third-party vendor instructions, which if executed by a processor perform a method comprising:
determining a pixel error threshold value if the pixel error threshold value is not to be determined by the error diffusion acceleration logic;
comparing the intermediate pixel value to the threshold value if the error diffusion acceleration logic is not to compare the intermediate pixel value to the threshold value;
generating a modified intermediate pixel value; generating an output pixel.

16. The system of claim 15 wherein the error diffusion accelerator is to generate a pixel error value by comparing the threshold value with either the intermediate pixel value or the modified intermediate pixel value.

17. The system of claim 15 further comprising an audio device coupled to the memory unit.

18. The system of claim 16 wherein the memory unit is within a processing element, the processing element further comprising an arithmetic logic unit to execute the third-party vendor instructions.

19. The system of claim 16 wherein the pixel error value is due to a conversion of components of the pixel from one pixel depth to another.

20. A method comprising:
converting pixel components of a digitally-represented image from a first depth to a second depth;
traversing the digitally-represented image;
storing pixel errors temporarily into a first-in-first-out buffer until pixels to which the pixel errors correspond are traversed;
performing a first set of error diffusion operations within an error diffusion accelerator and performing a second set of error diffusion operation within a processing element performing user-generated error diffusion instructions.

21. The method of claim 20 further comprising choosing between a set of results from the first and second set of operations.

22. The method of claim 21 wherein the first and second set of operations include any of a group consisting of: determining an error threshold value, a thresholding operation, generating an intermediate value.

23. The method of claim 22 wherein the set of results include any of a group consisting of: the error threshold value, the result of thresholding operation, the intermediate value.

24. The method of claim 23 wherein the choosing is to result in the same choice of results among the set of results for all pixels traversed within the digitally-represented image.

25. The method of claim 24 further comprising generating an error to be distributed among a plurality of cumulative error values, the cumulative error values corresponding to neighboring pixels of the converted pixels.

* * * * *